United States Patent [19]

Martin et al.

[11] 3,795,329

[45] Mar. 5, 1974

[54] FOLDABLE TAILGATES

[75] Inventors: Paul H. Martin, Toronto; William C. McKee, Willowdale, Ontario, both of Canada

[73] Assignee: Diesel Equipment Limited, Ontario, Canada

[22] Filed: Nov. 28, 1972

[21] Appl. No.: 310,122

[52] U.S. Cl. ................................. 214/75 T, 187/9
[51] Int. Cl. ............................................. B60p 1/44
[58] Field of Search ......... 214/75 T, 77 R, 77 P, 85; 187/9; 296/55, 57, 61

[56] References Cited
UNITED STATES PATENTS

| | | | |
|---|---|---|---|
| 3,675,739 | 7/1972 | Erlinder | 214/75 T |
| 1,630,473 | 5/1927 | Ducondu | 214/77 P |
| 2,776,063 | 1/1957 | Larson | 296/61 |
| 1,449,653 | 3/1923 | Carlson | 296/55 |
| 398,237 | 2/1889 | Creed | 296/55 |
| 709,193 | 9/1902 | Barson | 296/57 A |
| 3,734,239 | 5/1973 | Martin et al. | 214/75 T |

*Primary Examiner*—Gerald M. Forlenza
*Assistant Examiner*—Lawrence J. Oresky
*Attorney, Agent, or Firm*—Fetherstonhaugh & Co.

[57] ABSTRACT

A powered tailgate consisting of a foldable platform having a support arm projecting upwardly from the outer part for connection at its upper end to a flexible connecting device the other end of which is connected to the upper end of the slide member which supports the platform for vertical movement. The support arm is mounted on the outer platform portions so as to project upwardly therefrom so that the plane in which the flexible connecting means extends when the platform is in the open position projects outwardly from the outer end of the platform so that the platform is stable when loads are applied at the outer edge thereof. The support arm is spaced inwardly from the outer edge of the platform so as to provide clearance at the side edges of the outer portion of the platform adjacent the outer edge thereof. A manually engageable lever arm is connected to the inner portion of the platform and projects outwardly therefrom in a direction away from the hinged connection of the inner portion of the platform to the side members. The arm facilitates the manual movement of the tailgate from the folded to the unfolded configuration and vice-versa.

9 Claims, 5 Drawing Figures

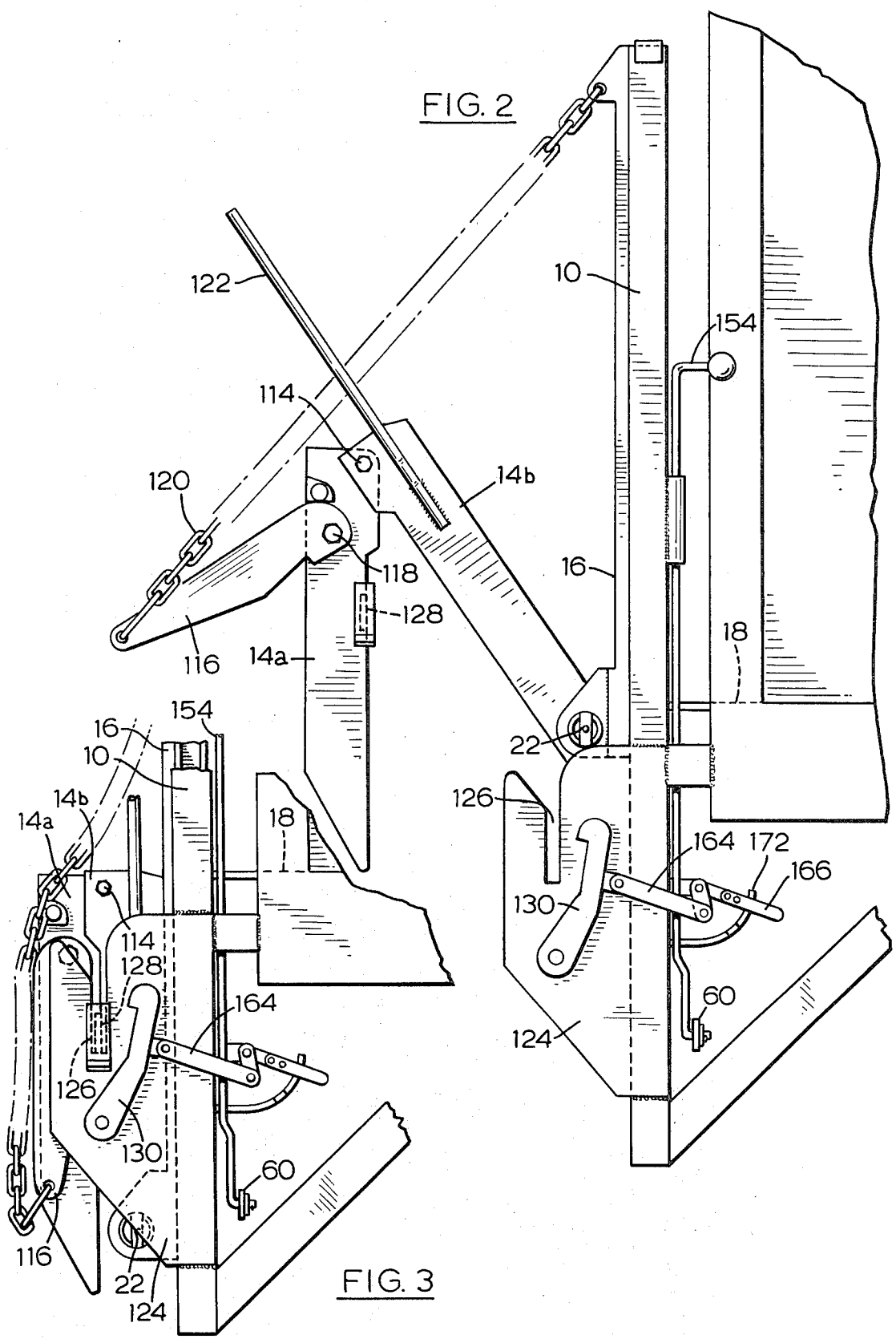

3,795,329

FOLDABLE TAILGATES

FIELD OF INVENTION

This invention relates to improvements in powered tailgates for trucks. In particular, this invention relates to an improved foldable tailgate which can be easily manipulated to the open or closed position.

PRIOR ART

When a foldable tailgate is in use during the loading of a vehicle, it is important to ensure that care is taken during the loading operation to prevent a situation wherein the application of the load to a portion of the platform may result in the platform being forced to move to the folded configuration. If, for example, a very heavy load were applied to the outer end of a platform which was supported by chains or the like spaced inwardly from the outer end, it is quite conceivable that the load could cause the platform to fold to the folded configuration causing the load to fall from the platform. To overcome this difficulty, it has been suggested that the chains used for supporting the platform should be connected closely adjacent the outer end of the outer portion of the platform so that all loads applied to the platform will be inboard of the chain connection. The mounting of a chain in this manner has the effect of restricting access to the outermost end of the platform; that is to say, it is necessary to carefully align the load which is to be positioned on the platform between the chains before beginning to move the load onto the platform. Generally, it is more difficult to effect the initial transfer of the load onto the platform than it is to move the load across the platform once it has been started on its way. As a result, the outer ends of the supporting chains frequently act as obstructions to the initial aligning of the load with the platform.

A further difficulty which has been experienced with the use of a folding platform is in the folding and unfolding operation. Platforms of the type of the present invention are fabricated from a heavy gauge steel and as a result they are quite heavy. In order to manually manipulate the platform from the folded to the unfolded configuration, considerable physical effort has heretofore been required. One of the problems is that if the suspension chain mounted adjacent the hinge point connecting the two halves, very little mechanical advantage is derived during the action of folding the outermost portion into the horizontal position. If, on the other hand, the chain is mounted at the outer end of the platform, considerable difficulty is experienced in ensuring that the chain operates to unfold the platform and in the unfolding operation, the outer portion of the platform starts to move to the horizontal position almost immediately after the inner portion of the platform moves away from the vertical position so that the initial force required to unfold the tailgate is substantial. Similarly, a substantially initial force is required to effect the folding operation.

The present invention overcomes the difficulties of the prior art described above and provides a folded tailgate which is stable in the unfolded configuration and which is easy to manipulate from the folded to the unfolded configuration and vice versa. The improved stability is achieved by the use of support arms extending upwardly and outwardly from the outer portion of the platform for connection to flexible connecting members, the other end of which are connected to the upper end of the vertical support pillars which support the platform during the raising and lowering operation. The plane in which the flexible support member extends when the platform is unfolded projects outwardly from the outer end of the platform so that heavy loads may be applied to the platform without any risk of the platform folding. The fact that the support arms are located adjacent the inner edge of the outer portion of the platform provides sufficient clearance at the outer end of the platform to facilitate the initial loading of the platform in use.

The difficulties associated with the folding and unfolding of the platform are considerably reduced by providing, in combination with the support arm structure described above, a torsion bar assembly at the inner end of the inner portion of the platform for urging the inner portion to the folded configuration and a manually engageable handle projecting outwardly from the outer end of the inner portion of the platform in a direction substantially radially of the axis of rotation of the torsion bar assembly.

SUMMARY OF INVENTION

According to an embodiment of the present invention, a powered tailgate for a truck body of the type in which the tailgate platform is pivoted at its inner end to vertically oriented slide members, the slide members being mounted on a truck body whereby the tailgate can be raised or lowered, is improved by forming a platform which has an inner part and an outer part which are hinged together along a horizontal hinge line whereby the gate may be folded upon itself for compact storage, support means projecting upwardly from said outer part of said platform and spaced inwardly from the outer edge of said outer part of said platform and means for connecting the support means to slide members in a plane which extends through a point at or adjacent the outer edge of the platform when the platform is in the unfolded position.

According to a further embodiment of the present invention, there is provided a tailgate as described above including manually engageable actuator means mounted on the inner part and projecting outwardly therefrom in a direction substantially parellel thereto and radially of the pivot mounting of the inner part to the truck body.

PREFERRED EMBODIMENTS

The invention will be more clearly understood after reference to the following detailed specification read in conjunction with the drawings wherein, FIG. 1 is a pictorial view of a tailgate according to an embodiment of the present invention illustrated in the unfolded configuration;

FIG. 2 is an end view of the tailgate of FIG. 1 in a partially folded configuration;

FIG. 3 is a partial end view illustrating the tailgate in the fully folded configuration;

Figure 1:
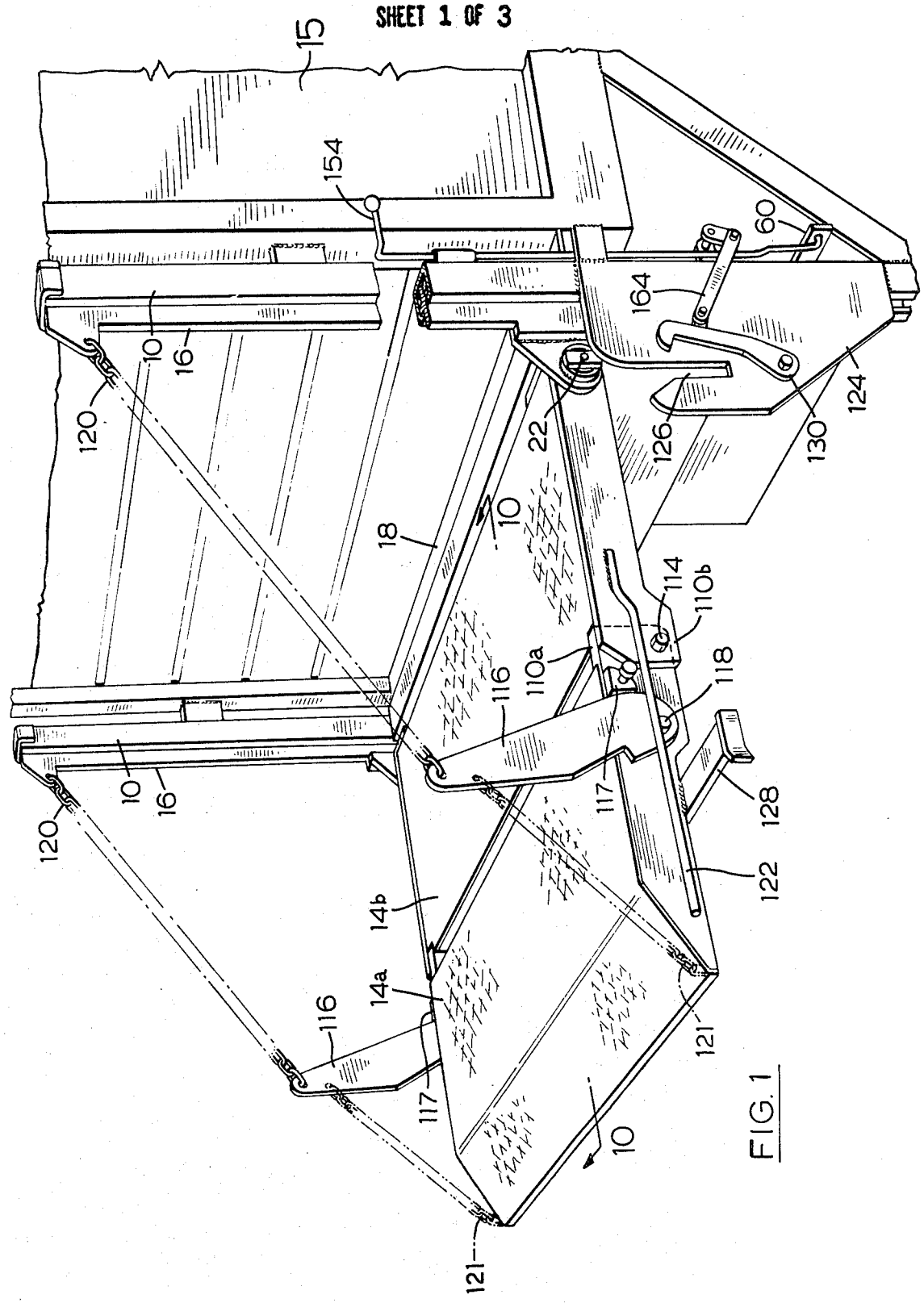
Figure 5:
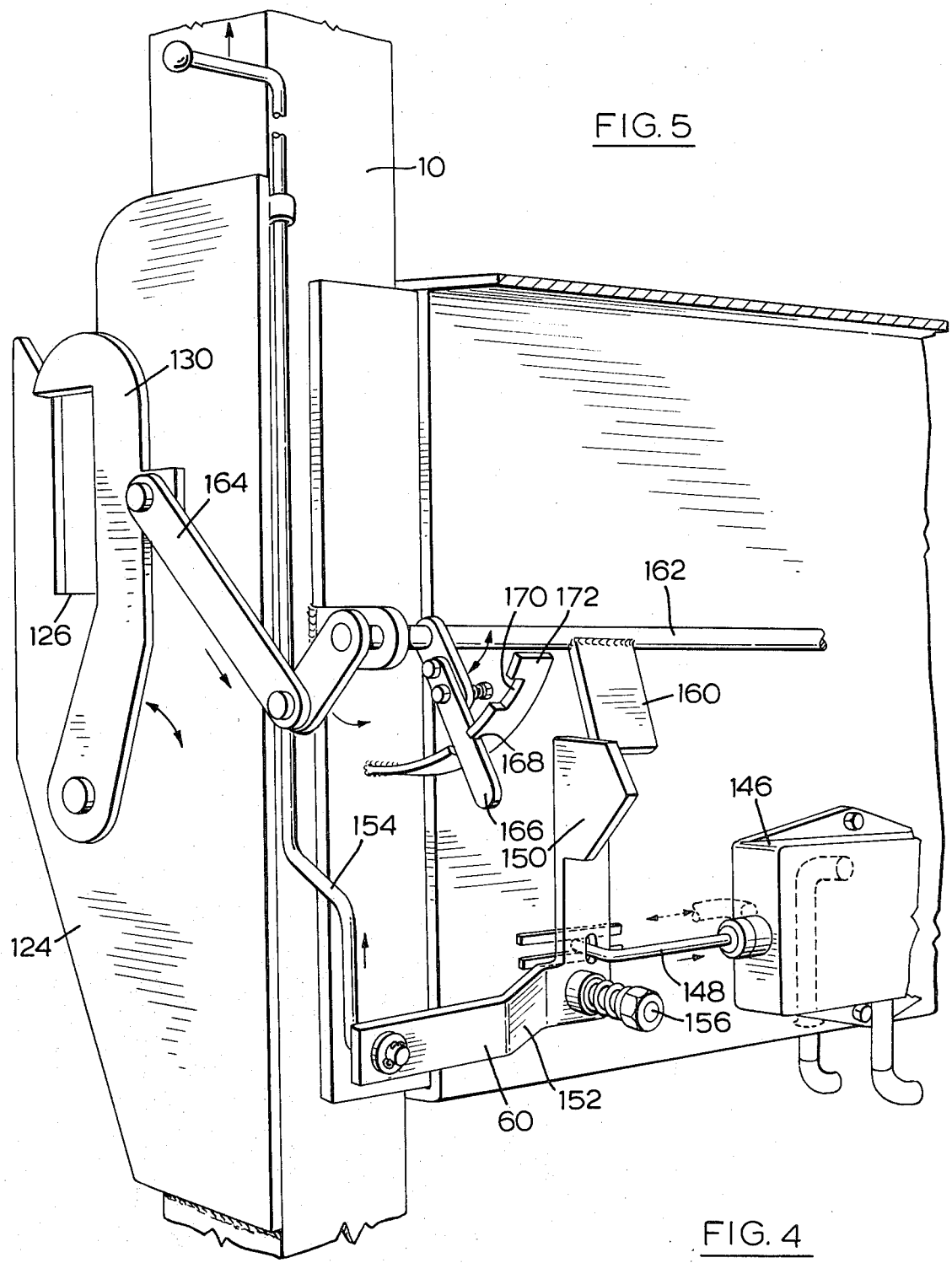
Figure 4:
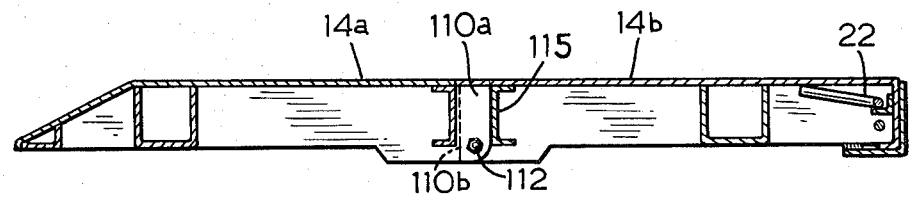

FIG. 4 is a sectional view of the platform taken along the line 10—10 of FIG. 1; and FIG. 5 is a pictorial view illustrating the locking mechanism and the mechanism used for preventing operation of the hoisting mechanism when the platform is in the locked position, the tailgate in the closed position and preventing operation of the hydraulic lifting mechanism when the tailgate is in the locked position.

With reference to the drawings, FIG. 1 illustrates a tailgate assembly according to the present invention mounted on the rear end of a truck 15 which has a floor 18. A pair of vertically oriented guide rails 10 are mounted at opposite sides of the truck and a pair of slides 16 are slidably mounted in the guides and are hydraulically driven for movement between the elevated position shown in FIG. 1 and a lowered position wherein the platform is close to ground level. The hydraulic drive mechanism for raising and lowering the platform of the present invention may be of the well known type and is not described in the present application. The operation of the hydraulic drive mechanism is by means of a control valve 146 as will be described hereinafter.

The tailgate platform consists of an outer portion 14a and an inner portion 14b which are hingedly connected to one another by means of hinge pins 114 at either side of the platform which extend through passages formed in flanges 110a and 110b. The hinge pin 114 is locked in position by means of a locking nut 112 (FIG. 4). The platform is foldable between the folded position shown in FIG. 3 of the drawings wherein the lower faces of the inner and the outer platform members 14a and 14b are disposed in face to face relationship and an unfolded configuration as shown in FIG. 4 wherein the outer ends of the flanges 110a bear against the transverse face of the beam 115 (FIG. 4). The inner portion 14b of the platform is pivotally mounted to the slides 16 and a torsion bar assembly 22 is provided to apply a torque to the platform, tending to cause the portion 14b to pivot in a direction towards the elevated position shown in FIG. 3. The torque bar assembly assists in the folding operation and also serves to maintain the gate in the folded configuration after the locking mechanism is released. A pair of support arms 116 are pivotably mounted on the outer portion 14a of the platform by means of pivot pins 118. The pivotal connection of the arms 116 to the platform 14a is located adjacent the inner end of the outer platform portion 14a so that when the arms 116 are in the elevated position shown in FIG. 1, they do not obstruct access to the front end of the platform portion 14a. The pivotal movement of the arms 116 is restricted by means of stop members 117 against which the arms 116 bear when they are in the fully elevated position. The support arms 116 are connected to the upper end of the slide member 16 by means of a flexible connection such as a chain 120. An important feature of the present invention is the fact that the arms 116 are proportioned and positioned relative to the upper end of the slide 116 so that when the chain is in the extended position illustrated in FIG. 1 of the drawings, it extends in a plane which projects outwardly from the outer end of the platform portion 14a. This arrangement serves to ensure that when a load is placed on the outer platform portion 14a, it will tend to further restrain the platform in the unfolded configuration rather than tending to cause the platform to fold about the pivot pins 114 as would be the case if the chain 120 was connected directly to the pivot pin 118. It is this construction which permits the applicant to obtain the advantages of clearance at the outer end of the platform while also eliminating the need for a locking mechanism for locking the platform in the unfolded configuration.

An actuator handle 122 is connected at its inner end to one edge of the platform portion 14b and it projects outwardly therefrom in a direction radially of the axis of rotation of the hinge connection with the side member 16 so as to be substantially parallel with the platform when it is in the unfolded configuration and so as to project substantially vertically when the platform is in the folded configuration. The actuator lever 122 may be manually engaged to effect movement of the platform between the folded and unfolded configurations.

The locking mechanism for locking the tailgate in the folded configuration includes a pair of flanges 124, each of which has a slot 126 opening therefrom to receive a latch pin 128 which is secured to the portion 14a of the platform. Latch member 130 is pivotally mounted on the flanges 124 and movable between a first position in which it serves to lock the latch bolt 128 within the slot 126 and a second position in which the slot is open.

When the tailgate is moved from the open configuration shown in FIG. 1 to the folded configuration by means of the actuator arm 122, the folded tailgate will initially be in the elevated position shown in FIG. 2. In order to lock the folded tailgate with respect to the latching mechanism, the hydraulic drive mechanism is operated to lower the tailgate to the position shown in FIG. 3. The latch member 130 is then manually moved to a position closing the slot 126 to lock the latch bolt 128 within the slot 126.

The supply of power to the hydraulic drive for raising and lowering the platform is controlled by a control valve 146 which has an operating member 148 by which it may be set to cause the platform to be raised or lowered as required. The operating member 148 is connected to one arm 150 of a bell-crank lever 152, the other arm of which is connected to a control rod 154 used by the operator to control the raising and lowering of the platform. The bell-crank lever 152 is pivotally mounted on a frame by means of a spring loaded pivot assembly 156. The movement of the arm 150 in a direction to raise the platform may be prevented by means of a lug 160 which projects radially from a shaft 162. The shaft 162 is connected by means of a linkage 164 to the latch member 130. The control lever 166 is mounted on the shaft 162 and may be moved between notches 168 and 170 on a guide plate 172. With reference to FIG. 5 of the drawings, it will be seen that when the control lever 166 is in notch 168, the plate 160 prevents the movement of the bell-crank arm 150 in a direction to supply hydraulic fluid to the drive mechanism for raising the platform. It will be understood that lowering of the platform is achieved by relieving the hydraulic pressure in the fluid supply so that the platform is lowered under its own weight. When the control arm 166 is moved to notch 170, the operation of moving the arm 166 causes the latch member 130 to move to the open position and simultaneously causes the stop member 160 to move out of position in which it prevents movement of the bell-crank arm 150. When the latch member 130 has been released, the control arm 154 may be operated to cause the hydraulic fluid to be supplied to the drive mechanism for the raising of the platform and the platform may be raised to disengage the bolt 128 from the slot 126.

As previously indicated, the structure illustrated in FIGS. 1 to 5 has a number of advantages, one of which is the facility with which the platform may be moved from the unfolded to the folded configuration and vice-versa. Clearly the mounting of the chain 120 on the arm 116 applies a greater opening moment about the pivot 114, then has previously been available. Similarly it will be noted that if the chain 120 was connected at the outer end of the platform portion 14a, it would offer no assistance by way of an opening moment when the platforms are arranged in the position shown in FIG. 3 of the drawings. In order to utilize a chain mounted at the outer end of the platform portion 14a, guides would have to be provided to ensure that the chain 120 is draped over the outer surface of the platform portion 14a during the opening action. If the chain 120 was not carefully guided, the effect of mounting the chain at the outer end could be to apply closing moment. If the chain is guided the outer portion 14a would swing out rapidly if the platform is unfolded. A further advantage derived from the use of the mounting of the chain 120 at the outer end of the arm 116 is that it facilitates the folding of the door as it permits the center of gravity of the outer panel 14a to approach the axis of the torsion device 22 more rapidly thereby increasing the effectiveness of the torsion device in the closing operation. The opposite effect is true when opening the door in that by reason of the fact that the centre of gravity of the outer portion 14a is retained in an inboard position during the initial opening stage, it is easier for the operator to move the control arm 122 out of the vertical position to the obliquely disposed position shown in FIG. 2 of the drawings. It will be apparent that once the operator has moved the lever 122 to the position shown in FIG. 2, it is easier for the operator to apply the force required to move the portion 14a in a horizontal position. The fact that the chain does extend in a plane which pass ajacent and preferably outwardly from the end of the platform ensure that even when a heavy load is applied at the outermost end of the platform it will not tend to fold.

The foregoing description presents one specific embodiment of the invention, but it should be understood that modifications are possible without departing from the scope of the invention.

What I claim as my invention is:

1. In a powered tailgate for a truck body of the type in which the tailgate platform is pivoted at its inner end to vertically oriented slide members, the slide members being rigidly mounted on the truck body whereby the tailgate can be raised and lowered, the improvement which comprises a platform which has an inner part and an outer part which are hinged together along a horizontal hinge line whereby the gate may be folded upon itself for compact storage, support means projecting upwardly from said outer part of said platform and spaced inwardly from the outer edge of said outer part of said platform, said support means being secured against rotation relative to the outer part in the unfolding direction and having a length which is at least equal to half the length of one of the pivoted platform parts, and means for connecting said support means to said slide members in a plane which extends through a point at or adjacent the outer edge of said platform when the platform is in the unfolded position.

2. A powered tailgate as claimed in claim 1 wherein said support means comprises a pair of arms pivotably mounted one at either side of said front part for movement between said upwardly projecting position and the lowered storage position in which said arms are substantially parallel to said outer part and project away from said pivotal connection between said inner part and said outer parts and stop means for preventing rotation of said arms in the unfolding direction beyond said upward position when said platforms are in the unfolded position.

3. A powered tailgate as claimed in claim 2 including chain means for connecting the upper ends of said arms to the upper ends of said slide members and extending in said support plane when said platform is in said unfolded position.

4. A powered tailgate as claimed in claim 3 including second chain means connecting the upper ends of said arms to the outer end of said outer platform part.

5. A powered tailgate as claimed in claim 1 including manually engageable actuator means mounted on said inner part and projecting outwardly therefrom in a direction substantially parallel thereto and radially of the pivot mounting of said inner part to said truck body.

6. A powered tailgate as claimed in claim 5 including torsion bar means operative about said pivot mounting of said inner part to said truck body urging said inner part in a direction towards the closed tailgate position.

7. A powered tailgate as claimed in claim 6 including means for locking the parts of the tailgate relative to one another and relative to said truck when in the folded configuration.

8. In a powered tailgate as claimed in claim 1, having means for controlling the supply of hydraulic fluid to effect raising and lowering of the tailgate, the further improvement of means for preventing the operation of said control means when said tailgate parts are in said locked and folded position relative to said truck.

9. In a powered tailgate for a truck body of the type in which the tailgate platform is pivoted at its inner end to vertically oriented slide members, the slide members being rigidly mounted on the truck body whereby the tailgate can be raised and lowered, the improvement which comprises a platform which has an inner part and an outer part which are hinged together along a horizontal hinge line whereby the gate may be folded upon itself for compact storage, support means projecting upwardly from said outer part of said platform and spaced inwardly from the outer edge of said outer part of said platform, said support means having a length which is at least equal to half the length of one of the pivot platform parts; means for connecting said support means to said slide members in a plane which extends through a point at or adjacent the outer edge of said platform when the platform is in the unfolded position, said support means consisting of a pair of arms pivotably mounted one at either side of said front part for movement between said upwardly projecting position and the lowered storage position in which said arms are substantially parallel to said outer part and project away from said pivotal connection between said inner part and said outer parts, and stop means for preventing rotation of said arms beyond said upward position when said platforms are in the unfolded position; first chain means for connecting the upper ends of said arms to the upper ends of said slide members and extending in said support plane when said platform is in said unfolded position, second chain means connecting the upper ends of said arms to the outer ends of said outer platform part, manually engageable lever means mounted on said inner part and projecting outwardly therefrom in a direction substantially parallel thereto and radially of the pivot mounting of said inner part to said truck body, torsion bar means operative about said pivot mounting of said inner part to said truck body urging said inner part in a direction towards the closed tailgate position.

* * * * *